US010099642B2

(12) United States Patent
Bachmann et al.

(10) Patent No.: US 10,099,642 B2
(45) Date of Patent: Oct. 16, 2018

(54) LOCKING PIN FOR MOUNTING AN AIRBAG MODULE ON A MOTOR VEHICLE

(71) Applicant: TRW Automotive Safety Systems GmbH, Aschaffenburg (DE)

(72) Inventors: Stefan Bachmann, Heimbuchenthal (DE); Andre Funk, Aschaffenburg (DE); Klaus Hörst, Schneeberg (DE); Dieter Rumpf, Rödermark (DE); Alexander Weiss, Aschaffenburg (DE)

(73) Assignee: TRW AUTOMOTIVE SAFETY SYSTEMS GmbH (DE)

( * ) Notice: Subject to any disclaimer, the term of this patent is extended or adjusted under 35 U.S.C. 154(b) by 80 days.

(21) Appl. No.: 15/122,950

(22) PCT Filed: Mar. 3, 2015

(86) PCT No.: PCT/EP2015/000472
§ 371 (c)(1),
(2) Date: Sep. 1, 2016

(87) PCT Pub. No.: WO2015/131993
PCT Pub. Date: Sep. 11, 2015

(65) Prior Publication Data
US 2017/0066398 A1    Mar. 9, 2017

(30) Foreign Application Priority Data
Mar. 4, 2014    (DE) .................. 10 2014 002 785

(51) Int. Cl.
*B60R 21/203*    (2006.01)
*F16B 19/00*    (2006.01)

(52) U.S. Cl.
CPC ........ *B60R 21/2037* (2013.01); *F16B 19/004* (2013.01)

(58) Field of Classification Search
CPC ....................... B60R 21/2037; F16B 19/004
See application file for complete search history.

(56) References Cited

U.S. PATENT DOCUMENTS

| | | | |
|---|---|---|---|
| 5,593,178 A | 7/1997 | Shiga et al. | |
| 5,775,725 A * | 7/1998 | Hodac | B60Q 5/003 280/728.2 |
| 6,474,682 B2 * | 11/2002 | Ikeda | B60Q 5/003 200/61.55 |
| 7,357,409 B2 * | 4/2008 | Frisch | B60Q 5/003 200/61.54 |
| 7,621,560 B2 * | 11/2009 | Spencer | B60R 21/2037 200/61.54 |
| 8,919,812 B2 * | 12/2014 | Schutz | B60R 21/2037 280/728.2 |

(Continued)

FOREIGN PATENT DOCUMENTS

| | | | | |
|---|---|---|---|---|
| EP | 1020332 A2 * | 7/2000 | ......... | B60R 21/2037 |
| FR | 2790044 | 8/2000 | | |

*Primary Examiner* — Faye M Fleming
(74) *Attorney, Agent, or Firm* — Tarolli, Sundheim, Covell & Tummino LLP

(57) ABSTRACT

In the case of a locking pin (22) for vertically movable mounting of an airbag module (30) on a frame (12) of a motor vehicle steering wheel (10) and at least in part within a foam structure (20) molded onto the frame (12), the locking pin (22) includes at least one stop for the airbag module (30) which is integrally bonded to the locking pin (22).

11 Claims, 4 Drawing Sheets

(56) References Cited

U.S. PATENT DOCUMENTS

| | | | |
|---|---|---|---|
| 9,475,428 B2* | 10/2016 | Celada Yebenes | ........................... B60R 21/2037 |
| 2009/0085334 A1* | 4/2009 | Matsu | ................. B60R 21/2037 280/731 |
| 2012/0242064 A1* | 9/2012 | Weigand | ................ B60Q 5/003 280/728.2 |
| 2012/0292895 A1 | 11/2012 | Schutz | |
| 2014/0203539 A1 | 7/2014 | Bachmann et al. | |

* cited by examiner

LOCKING PIN FOR MOUNTING AN AIRBAG MODULE ON A MOTOR VEHICLE

RELATED APPLICATIONS

This application corresponds to PCT/EP2015/000472, filed Mar. 3, 2015, which claims the benefit of German Application No. 10 2014 002 785.6, filed Mar. 4, 2014, the subject matter of which are incorporated herein by reference in their entirety.

BACKGROUND OF THE INVENTION

The present invention relates to a locking pin for mounting an airbag module in a vertically movable manner on a frame of a motor vehicle steering wheel and at least in part within a foam structure molded onto the frame. Moreover, the present invention relates to a vehicle steering wheel comprising a frame and at least one locking pin for mounting an airbag module in a vertically movable manner on the frame and at least in part within a foam structure molded onto the frame.

It is known from the state of the art to mount a vertically movable airbag module in the area of an impact absorber of a motor vehicle steering wheel. With the aid of the vertically movable airbag module additional electric functions such as e.g. blowing a horn or the like can be triggered by an appropriate vehicle driver pressing the airbag module down. For fastening the airbag module on the vehicle steering wheel usually locking pins are utilized which, on the one hand, enable tolerances to be compensated while simultaneously minimizing required clearances and which, on the other hand, ensure a mechanically absolutely reliable connection between the airbag module and a corresponding steering wheel frame as well as the foam structure molded onto the latter. In addition, in the ideal case a sliding actuation of the additional electric functions free from jamming and jerking is to be ensured by pressing down the airbag module. In order to create a defined axial stop for the resiliency fastened airbag module the conventional locking pins are usually equipped with rigid stops.

SUMMARY OF THE INVENTION

Therefore it is an object of the invention to describe a novel locking pin for mounting an airbag module and, respectively, an inflator in a vertically movable manner on a metallic frame of a motor vehicle steering wheel, which locking pin allows a more comfortable operation for the motor vehicle driver.

This object is achieved by a locking pin for vertically movable mounting of an airbag module on a frame of a vehicle steering wheel and at least in part within a foam structure melded onto the frame, the locking pin including at least one stop for the airbag module which is formed integrally with the locking pin.

In this way, when pressing down the vertically movable airbag module (so called "hooting movement"), i.e. at the lower end of the axial travel distance of the airbag module, a defined stop behavior for the hooting movement is resulting. Moreover, the locking pin permits a vertically movable mounting of the airbag module on the motor vehicle steering wheel which is mechanically absolutely reliable in all operating conditions and has narrow tolerances for reducing clearances while still being smooth-running. Furthermore, the number of constructional components required to realize the defined stop behavior of the airbag module remains unchanged.

Of preference, the at least one stop includes a web radially facing away from the locking pin which is transformed into an at least approximately U-shaped bracket.

This results in a resilient stop behavior for the hooting movement increasing convenience, wherein the cushioning and damping behavior of the stop is adjustable within broad limits.

According to an embodiment, a pin-shaped support for the airbag module is formed on a free end of a first leg of the bracket and a second leg of the bracket is transformed into the web.

In this way, in transverse directions relative to the longitudinal center axis of the locking pin a reliable securing of the supports in position relative to the airbag module is provided. For this purpose, the at least one support may include e.g. a hollow-cylindrical recess into which a cylindrical pin formed at the bottom of the airbag module and of the inflator carrier, respectively, can be positively introduced at least in portions.

According to an embodiment, the legs of the bracket extend at least approximately in parallel to a peripheral radially outwardly directed flange of the locking pin, the flange extending at least approximately perpendicularly to a longitudinal center axis of the locking pin and the at least one web of the at least one stop being configured on the flange.

In this way the spring force of the at least one stop acts substantially continuously perpendicularly to the hooting movement of the airbag module.

Preferably two stops positioned to be diametrically opposed to each other are formed in the area of the flange of the locking pin.

Thus the spring action of the stops can be increased. At the same time, due to the symmetrical arrangement the airbag module is prevented from tilting with respect to the longitudinal center axis during the hooting movement.

Preferably an at least approximately U-shaped fixture for an electric connection line is associated with the locking pin, wherein the fixture is formed integrally with the locking pin.

This allows to provide, by means of the locking pin, at the same time a positional securing for an electric connection between the airbag module and the motor vehicle steering wheel which can be used, e.g., for controlling the airbag module, a horn, the transmission, an entertainment unit or other electric components in the area of the motor vehicle steering wheel. Preferably the fixture between the flange and a web of a stop is formed integrally with the same.

According to an embodiment, a first axial end portion of the locking pin is configured to receive a guide bush associated with the airbag module by locking the same in place and a second axial end portion of the locking pin facing away herefrom includes at least in part a peripheral thickened rim having a cross-sectional geometry which is trapezoidal at least in part.

In this way, there is provided a form-fit anchoring within the foam structure molded onto the motor vehicle steering wheel and moreover a mechanical locking with the metallic frame of the motor vehicle steering wheel. Thus mechanical mounting of the airbag module reliable in all operating conditions—including triggering of the airbag module in the case of crash of the motor vehicle—on the frame of the motor vehicle steering wheel and, respectively, the foam structure thereof is given.

According to an embodiment, a first axial and portion of the locking pin is configured to receive a guide bush associated with the airbag module by locking the same in place and a second axial end portion of the locking pin facing away therefrom can be positively connected to the frame of the motor vehicle steering wheel, can be especially thermally joined to the same.

In this way, an alternative highly vibration-resistant mounting option of the locking pin on the frame of the steering wheel is provided. Furthermore, the locking pins can be connected to the frame of the steering wheel by means of a screwed connection so as to allow for compensation of larger radial tolerances.

Preferably, the locking pin includes a cut extending transversely to its longitudinal center axis having an approximately plane and rectangular base area for receiving a spring associated with the airbag module in a resiliency locking manner.

Due to the cut an especially reliable form-fit latching is provided between the locking pin and a guide bush associated with the bottom of the airbag module and the bottom of the inflator carrier, respectively. The width of the cut is dimensioned with respect to a diameter of a spring wire of the spring such that at the same time the desired axial vertical movement of the airbag module can be realized.

According to an embodiment, a substantially mushroom-shaped pin is formed on at least one web of the at least one stop, said pin facing away from the first axial end portion of the locking pin.

The mushroom-shaped pin enables an additional anchoring of the webs to be realized in the foam structure molded onto the frame of the motor vehicle steering wheel.

On the proviso of a further embodiment, the locking pin is formed integrally with a plastic material.

This allows inexpensive manufacture of the locking pin adapted for large-scale production e.g. in the injection molding process, while at the same time excellent dimensional stability is given. The plastic material may also be provided with fiber armor for mechanical reinforcement.

The object defined in the beginning is equally achieved by a motor vehicle steering wheel comprising a frame and at least one locking pin for vertically movable mounting of an airbag module on the frame and at least in part within a foam structure molded onto the frame in which the locking pin includes at least one stop for the airbag module which is formed integrally with the locking pin.

Accordingly, when pressing down the vertically movable airbag module, i.e. at the lower end of the axial travel distance of the airbag module, a defined stop behavior for increased convenience is resulting. Moreover, the locking pin allows mounting of the airbag module in a vertically movable manner which is mechanically absolutely reliable in all operating conditions and has narrow tolerances for reducing clearances while still being smooth-running on the motor vehicle steering wheel. In order to ensure most stable, unhindered and smooth-running vertical movability of the airbag module relative to the frame of the motor vehicle steering wheel, preferably at least three locking pins are resiliency locked with a corresponding number of guide or locking bushes of the airbag module, while simultaneously at least in parts a form closure is produced.

BRIEF DESCRIPTION OF THE DRAWINGS

Further details and advantageous further developments of the invention will be evident from the embodiments described hereinafter and illustrated in the drawings which by no means have to be understood as restriction of the invention.

They show in.

DESCRIPTION

Figure 1:
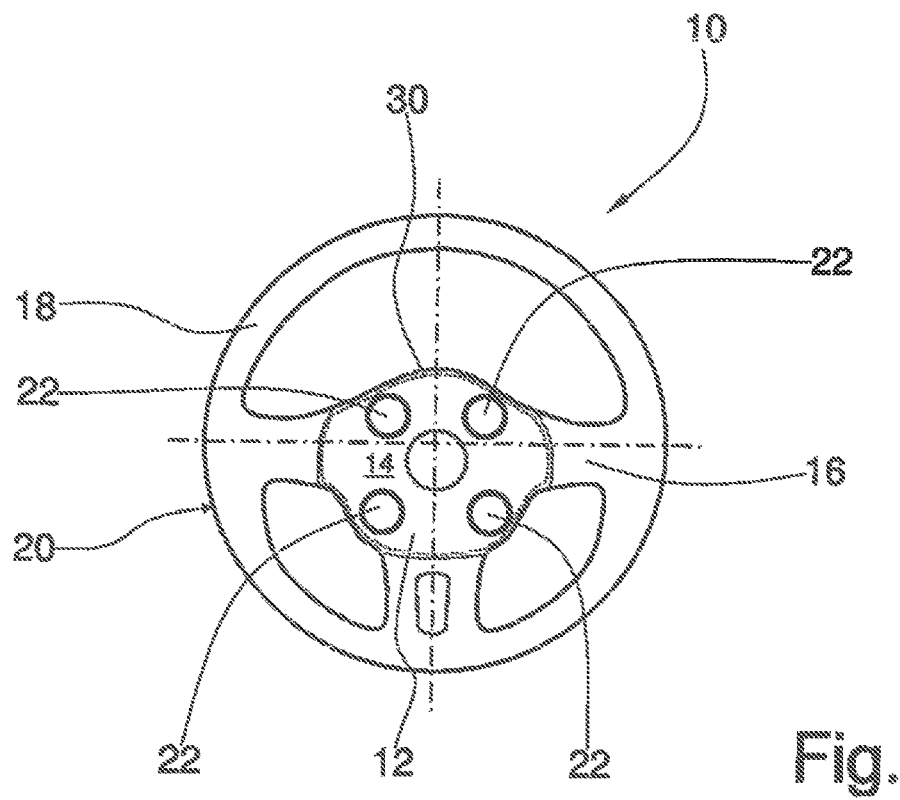
FIG. 1 a top view onto a motor vehicle steering wheel.

Equal or equally acting parts are denoted with the same reference numerals in the various figures and as a rule are described only once.

FIG. 1 illustrates a motor vehicle steering wheel 10 which includes a preferably metallic frame 12 having a carrier plate 14, spokes 16 and a peripheral rim 18. The (steering wheel) rim 18, the spokes 16 and parts of the carrier plate 14 of the motor vehicle steering wheel 10 are preferably provided with a foam structure 20 formed by a suited foamed plastic.

In the area of the carrier plate 14 four similar locking pins 22 are illustratively arranged on the motor vehicle steering wheel 10. They serve for guiding and mounting an airbag module 30 known per se in a manner vertically movable with respect to the plane of projection, with the airbag module being indicated only by a dotted line and only part of the casing and the inflator carrier, respectively, being shown here. It is referred to the fact, however, that the number of the locking pins 22 in this case is four only by way of example and not for the purpose of restricting the invention which may also be realized with fewer or more than four locking pins.

Figure 2:
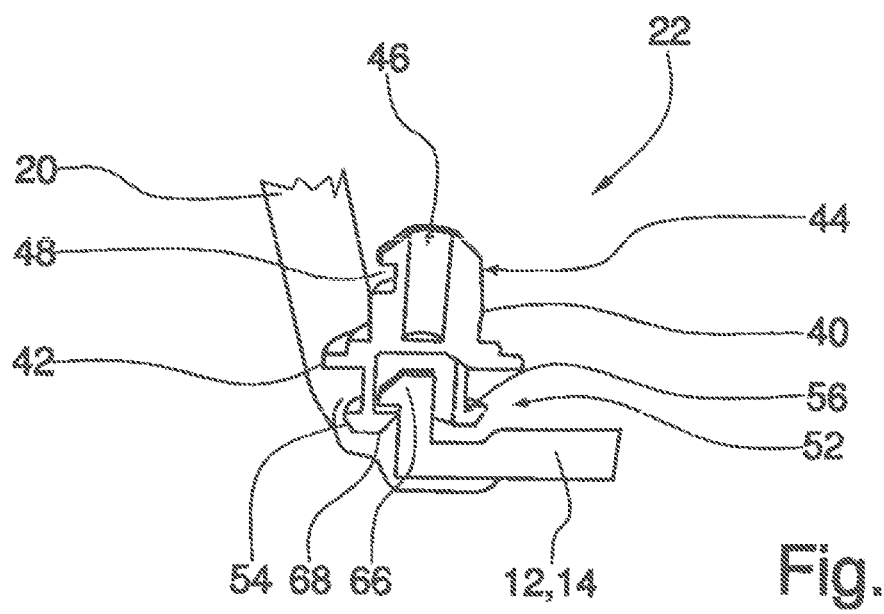
FIG. 2 a partly perspective cut view of a first embodiment of a locking pin for mounting an airbag module in a vertically movable manner on a motor vehicle steering wheel according to the present invention, FIG. 3 a sectional view of the locking pin of FIG. 2, FIG. 4 a perspective view of the locking pin of FIGS. 2 and 3, FIG. 5 another perspective view of the locking pin of FIG. 4, FIG. 6 a perspective view of the locking pin of FIG. 1 configured according to a second embodiment, and FIG. 7 another perspective view of the locking pin of FIG. 6.
Figure 3:
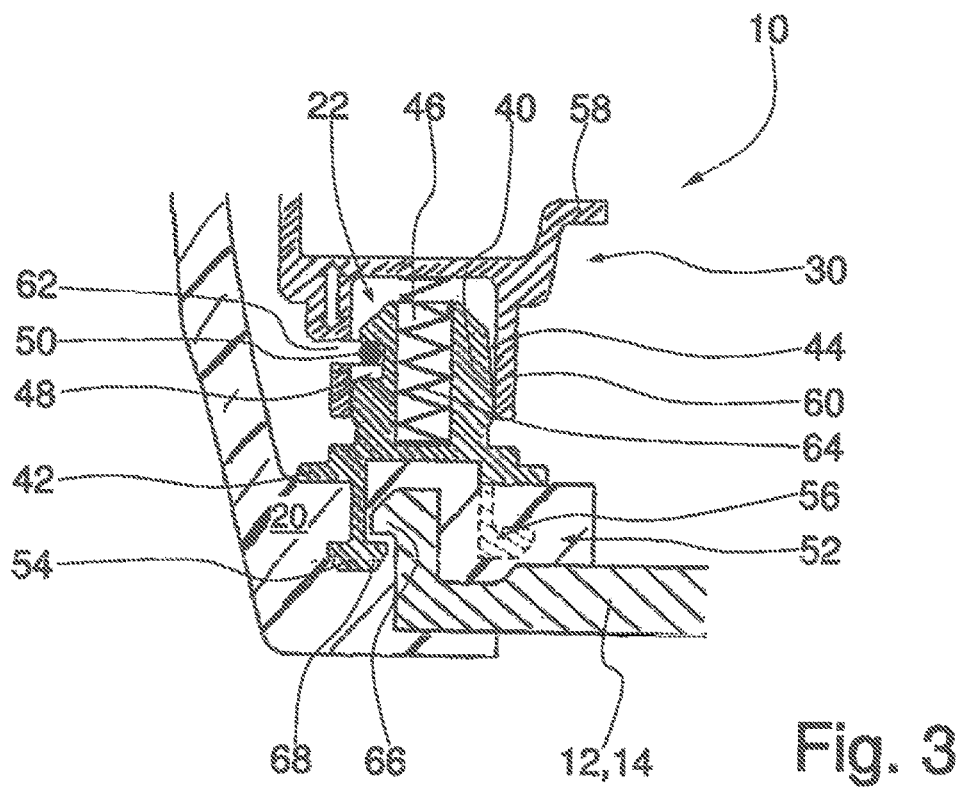

FIGS. 2 and 3—which in the further course of the description will be referred to at the same time—illustrate the locking pin 22 of FIG. 1 including a substantially hollow-cylindrical body 40 stepped several times in the axial direction on which a peripheral disk-shaped flange 42 or collar, respectively, is formed. With its peripheral flange 42 the locking pin 22 rests flush on the part of the foam structure 20 molded onto the motor vehicle steering wheel 10 of FIG. 1 disposed in the area of the carrier plate 14.

A first axial end portion 44 and guide portion, resp., of the locking pin 22 has a slightly spherical outer contour. On the front face an axial recess 46 is formed in the axial end portion 44. On the side located radially outside in the mounting position of the locking pin 22 the first axial end portion 44 further includes a cut 48 which interacts with a locking spring 50 fixed on the airbag module 30 and, resp., an inflator carrier 58 formed on the latter or connected thereto. In the embodiment shown here comprising the vertically movable airbag module 30 the height of the cut 48 is dimensioned to be larger than the diameter of the locking spring 50, thus enabling a defined axial movability of the airbag module 30 for the hooting movement, as illustrated in FIG. 3 by a double arrow that is not separately marked.

A second axial end portion 52 or, resp., anchoring portion of the locking pin 22 facing away from the first axial end portion 44 is embedded in the foam structure 20 of the carrier plate 14 of the frame 12. The second axial end portion 52 has a thickened rim 54 peripheral in portions which exhibits an approximately trapezoidal cross-sectional geometry. The second axial end portion 52 further includes a peripheral cut 56 starting from the open front face of the locking pin 22 which extends into the area of the flange 42. The cut 56 is arranged so that it points to the direction of the carrier plate 14 of the frame 12.

On the lower side of the inflator carrier 58 of the airbag module 30 four guide bushes corresponding to the locking pins 22 are formed—merely one guide bush 60 of which is shown here to be representative of the residual ones. Between the guide bush 60 and the first axial end portion 44 of the locking pin 22, which is illustratively spherical-shaped, in the mounted state there is a form closure at least in portions, wherein the guide bush 60 includes a cut 62 through which the locking spring 50 can move in the direction of the locking pin 22.

In the front-face recess 46 of the first axial end portion 44 of the locking pin 22 furthermore an axially biased compression spring 64 is received which is supported on the bottom of the inflator carrier 58 and on the locking pin 22, thus causing the inflator carrier 58 to be loaded in the direction of its non-actuated basic position. The axial shift distance of the guide bush 60 on the locking pin 22 is reliably delimited in the completely rebounded state of the inflator carrier 58 by the detent spring 50 located within the cut 56. Accordingly, also the other locking pins not shown here interact with the guide bushes of the inflator carrier 58 associated therewith.

When manufacturing the motor vehicle steering wheel 10 the steering wheel frame 12 together with the locking pin 22 is inserted into a molding tool. Upon closing the molding tool the locking pin 22 is positioned so that a detent hook 66 on the carrier plate 14 protrudes into the cut 56 of the second axial end portion 52 and accordingly engages behind a radially inwardly facing inner projection 68 of the rim 54. The closed molding tool is subsequently filled with known steering wheel foams so as to form the foam structure 20 of the motor vehicle steering wheel 10. During the foaming step, the foamed plastic can flow into the interior of the second axial end portion 52 through the open configuration of the second axial end portion 52 of the locking pin 22 and the cut 56 thereof and can safely fix the locking pin 22 inside the foam structure 20 of the steering wheel wrapping. By interaction of the detent hook 66 on the carrier plate 14 and the inner projection 68 of the second axial end portion 52 acting as locking contour corresponding hereto an additional fixation of the locking pin 22 on the carrier plate 14 and, resp., the frame 12 of the motor vehicle steering wheel 10 is achieved. This redundant connection can also withstand the high mechanical forces occurring upon release of the airbag module 30 and thus safely fix the module 30. Between the residual locking pins and guide bushes the same material-fit and form-fit connection is formed in the course of molding the foam structure onto the frame 12 of the motor vehicle steering wheel 10.

The locking pins can be mechanically secured onto the frame 12 of the motor vehicle steering wheel 10 alternatively by a connecting bolt, especially by a stud bolt. The screwing may be effectuated starting from both front ends of the axial end portions 44, 52 of the locking pins. In contrast to the positioning relative to the steering wheel shell with narrow tolerances, this connection can be made with larger tolerances especially in the radial direction.

Furthermore, a material-fit connection, e.g. by thermal joining, is possible between the second axial end portion 52 of the locking pins 22 and the carrier plate 14 of the frame 12 of the motor vehicle steering wheel 10. In this case, the locking pins are formed preferably integrally with a possibly fiber-armed thermoplastic material and can be inexpensively manufactured with high dimensional stability e.g. by way of the known injection-molding process in a way suited for large-scale production.

Figure 4:
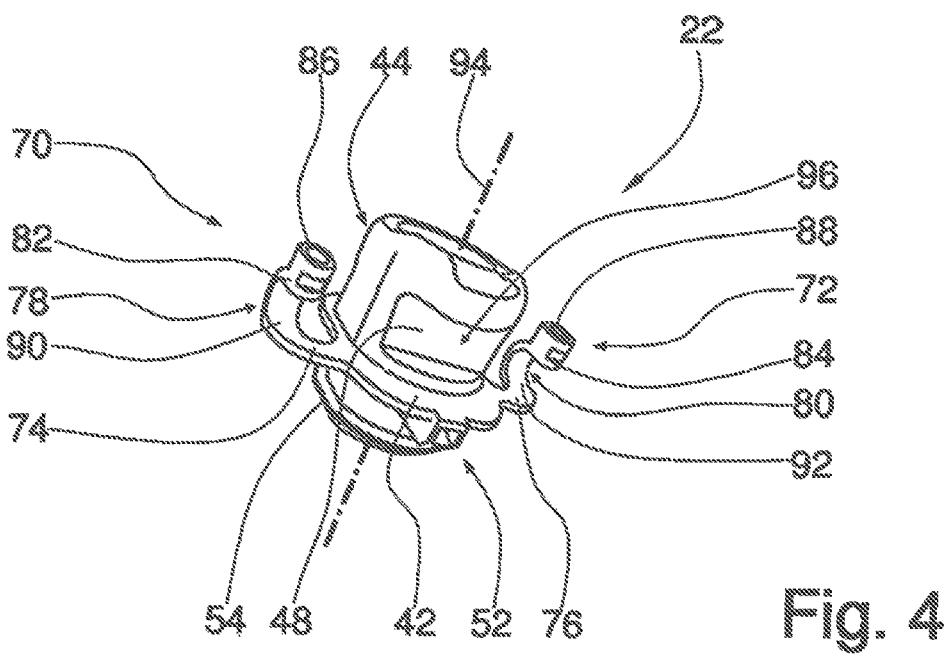
Figure 5:
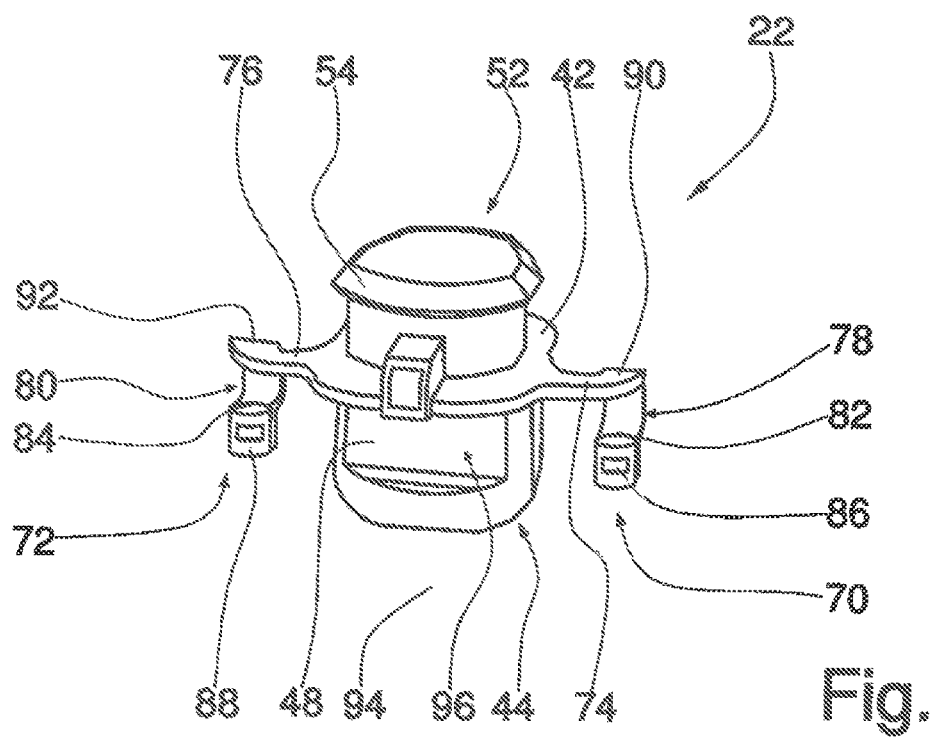

FIGS. 4 and 5—which will be simultaneously referred to in the further course of the description—show the flange 42 of the locking pin 22 onto which two stops 70, 72 are integrally and resiliently formed by way of example which cause a defined dampened stop behavior of the airbag module 30 for increasing convenience (not drafted here) on the frame 12 of the motor vehicle steering wheel 10 of FIG. 1 during a hooting movement. Each of the two stops 70, 72 arranged diametrically relative to each other comprises, inter alia, a web 74, 76 which is transformed into a U-shaped bracket 78, 80.

Free ends of first legs 82, 84 of the two brackets 78, 80 include respective pin-shaped supports 86, 88 for the airbag module. Second legs 90, 92 of the brackets 78, 80 are transformed into the respective webs 74, 76 and, respectively, are formed integrally with the same.

The supports 86, 88 may include respective recesses which in the mounted state positively interact at least in part with projections on the bottom of the airbag module and, resp., of the inflator carrier so as to obtain an especially radial securing of the position of the supports 86, 88 on the airbag module. Longitudinal axes (not shown) of the legs 82, 90 as well as 84, 92 of the brackets 78, 80 preferably extend approximately perpendicularly to a longitudinal center axis 94 of the substantially multi-stepped and hollow-cylindrical locking pin 22 and, respectively, transversely to the webs 74, 76. In this case the brackets 78, 80 by way of example are facing the same direction, but they can also be orientated in opposite directions.

A plane defined by the disk-shaped flange 42 extends preferably perpendicularly to a longitudinal center axis 94 of the body 44 of the locking pin 22. Due to brackets 78, 80 being U-shaped or being tilted in C-shape or in U-shape, a stop effect of the locking pin 22 dampened in a defined resilient manner and increasing the convenience is resulting vis-à-vis the airbag module being shifted in the case of a hooting movement relative to the locking pin 22 in parallel to the longitudinal center axis 94 and, respectively, vis-à-vis the bottom of the inflator carrier. By varying the geometry of the brackets 78, 80 the damping, stopping and rebounding behavior of the stops 70, 72 can be adjusted within broad limits and in a simple manner.

The first axial end portion 44 including the lateral cut 43, which by way of example has a plane rectangular base area 96, serves for locking the airbag module in place in a vertically movable manner by means of the detent spring, while the rim 54 thickened on the front face of the second axial end portion 52 is locked with the detent hook on the carrier plate of the frame of the motor vehicle steering wheel 10 of FIG. 1 and is additionally embedded in the foam structure of foamed plastic (cf. especially FIG. 3). As regards the further constructional details of the locking pin 22, the explanations within the scope of the description of FIGS. 2, 3 are referred to. Deviating from the locking pin 22 represented only by way of example here and having two resilient stops 70, 72, merely one or even more than two stops may be provided on each locking pin which can be arbitrarily spaced from each other around the flange.

Figure 6:
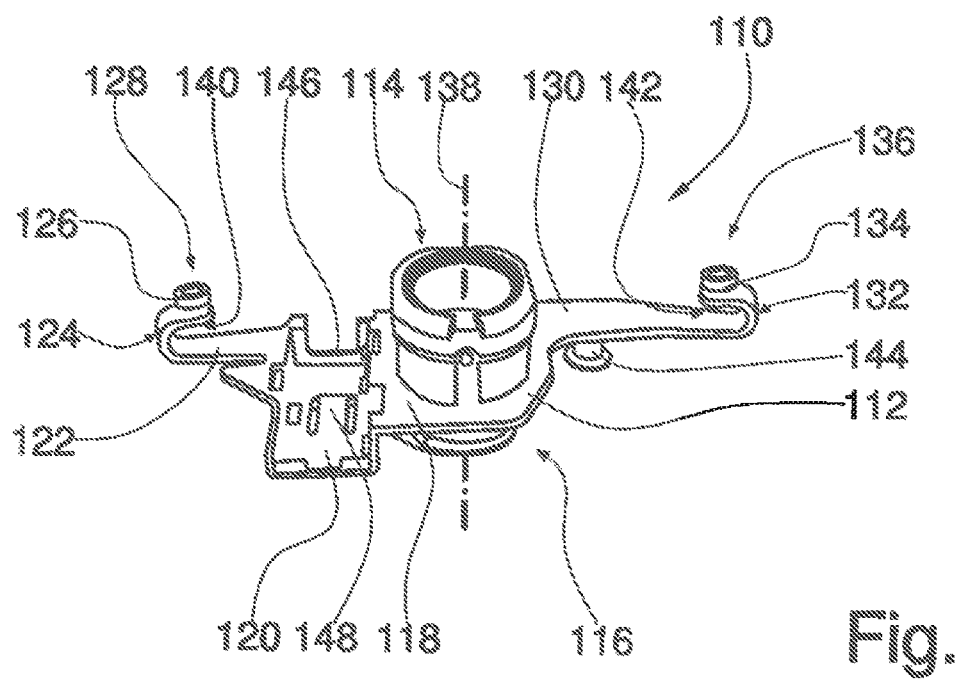
Figure 7:
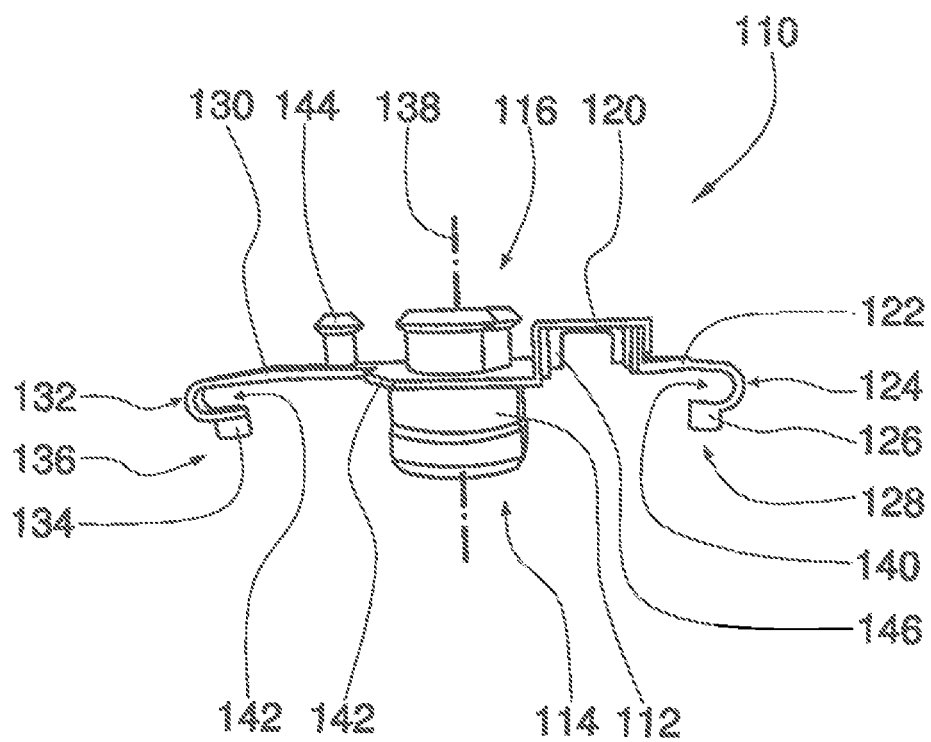

FIGS. 6 and 7—which will be simultaneously referred to in the further course of the description—show a locking pin 110 configured according a second embodiment having a preferably at least substantially hollow-cylindrical multi-stepped body 112 including first and second axial end portions 114, 116 between which a peripheral substantially disk-shaped flange 118 extends. The first axial end portion 116 of the locking pin 110 serves for form-fit guiding and locking in place with the locking bushes provided on the lower side on the bottom of the airbag module, while the second axial end portion 114 serves for form-fit and material-fit anchoring with a detent hook of the metallic frame of the motor vehicle steering wheel and the foam structure thereof. As regards the further details, the constructional structure of the body 112 of the second embodiment of the locking pin 110 exactly follows the configuration of the first embodiment of the body of the afore-explained locking pin so that, in order to avoid repetitions, here the description of FIGS. 2 to 5 can be referred to.

Differing from the first embodiment, the flange 118 of the locking pin 110 is laterally transformed into an approximately U-shaped or shoe-shaped fixture 120 for an electric connection line (not shown) or an electric connection element including connecting lines or the like. Such connection line may be used, for example, for controlling the airbag module, a horn, another optical and/or acoustic signal means, an electrically shiftable transmission, an electronic entertainment unit or other electric components within the area of the vehicle steering wheel.

An Integral web 122 whose free end is transformed into a U-shaped bracket 124 having a pin-shaped support 126 is integrally formed with the fixture 120, wherein the bracket 124 and the support 126 in turn constitute a stop 128 acting in a defined resilient manner for the airbag module not drafted here. In this case, diametrically to the web 122 another web 130 is formed by way of example on the flange 118 at the free end of which an equally U-shaped bracket 132 including a support 134 for forming a further stop 136 is integrally formed. Each of the supports 126, 134 faces toward the airbag module so that the resilient brackets 124, 132 in interaction with the supports 126, 134 constitute the stops 128, 136 for increasing convenience for the up and down movement of the airbag module being effectuated in parallel to a longitudinal center axis 138 in the course of blowing the horn.

Deviating from the first embodiment in which the legs of the brackets are arranged transversely to the webs, in this case the legs of the U-shaped brackets 124, 132 extend in parallel to the webs 122, 130. Furthermore, on the web 130 an illustratively mushroom-shaped pin 144 is formed which faces away from the first axial end portion 114 and the airbag module, resp., i.e. which is orientated in the direction of the carrier plate of the frame of the motor vehicle steering wheel.

By virtue of the mushroom-shaped pin 144 an additional mechanical connection of the web 130 to the foam structure molded onto the vehicle steering wheel is given. Said fastening option usually is of advantage, as in the ideal case both supports 126, 134 are arranged symmetrically to the longitudinal center axis 138 of the locking pin 110 on the body 112 or flange 118 thereof. In order to meet this requirement of symmetry regardless of the integration of the fixture 120 between the flange 118 and the (short) web 122, the web 130—as compared to the webs of the first embodiment of the locking pin—preferably has to be lengthened approximately by a width of the fixture 120 and accordingly has to be additionally held or supported centrally by the mushroom-shaped pin 144.

The U-shaped fixture 120 preferably includes on the end side a stop 146 and at least one detent element 148, especially a resilient detent tongue or the like, for fixing the connection line and, resp., the connection element in position. Said second embodiment of the locking pin 110 according to the invention is equally manufactured preferably in one piece by a suited and possibly fiber-armed plastic material by way of injection molding.

As a matter of course, within the scope of the present invention multiple variations and modifications of the geometric configuration of the locking pin including an integrated stop having a resilient and dampening effect for the vertically movable airbag module are imaginable.

The invention claimed is:

1. A locking pin (22, 110) for mounting an airbag module (30) in a vertically movable manner on a frame (12) of a motor vehicle steering wheel (10) and at least in part within a foam structure (20) molded onto the frame (12), wherein the locking pin (22, 110) comprises at least one stop (70, 72, 128, 136) for the airbag module (30), said stop being integrally bonded to the locking pin (22, 110), each stop (70, 72, 128, 136) including a web (74, 76, 122, 130) radially facing away from the locking pin (22, 110) which is transformed into an at least approximately U-shaped bracket (78, 80, 124, 132).

2. The locking pin according to claim 1, wherein on a free end of a first leg (82, 84) of the bracket (78, 80, 124, 132) a pin-shaped support (86, 88, 126, 134) for the airbag module (30) is formed and a second leg (90, 92) of the bracket (78, 80, 124, 132) is transformed into the web (74, 76, 122, 130).

3. The locking pin according to claim 2, wherein the legs (82, 84, 90, 92) of the bracket (78, 80, 124, 132) extend at least approximately in parallel to a peripheral radially outwardly directed flange (42, 118) of the locking pin (22, 110), wherein the flange (42, 118) extends at least approximately perpendicularly to a longitudinal center axis (94, 138) of the locking pin (22, 110) and the at least one web (74, 76, 122, 130) of the at least one stop (70, 72, 128, 136) is formed on the flange (42, 118).

4. The locking pin according to claim 3, wherein the area of the flange (42, 118) of the locking pin (22, 110) two stops (70, 72, 128, 136) which are positioned diametrically opposed to each other are formed.

5. The locking pin according to claim 1, wherein a first axial end portion (44) of the locking pin (22) is configured to receive by locking a guide bush (60) associated with the airbag module (30) and a second axial end portion (52) of the locking pin (22) facing away herefrom includes at least in part a peripheral thickened rim (54) exhibiting a cross-sectional geometry trapezoidal at least in part.

6. The locking pin according to claim 1, wherein a first axial end portion (114) of the locking pin (110) is configured to receive by locking a guide bush (60) associated with the airbag module (30) and a second axial end portion (116) of the locking pin (110) facing away herefrom can be materially bonded to the frame (12) of the motor vehicle steering wheel (10).

7. The locking pin according to claim 6, wherein the second axial end portion of the locking pin is thermally joined to the frame.

8. The locking pin according to claim 1, wherein the locking pin (22, 110) is formed integrally with a plastic material.

9. A locking pin (22, 110) for mounting an airbag module (30) in a vertically movable manner on a frame (12) of a motor vehicle steering wheel (10) and at least in part within a foam structure (20) molded onto the frame (12), wherein the locking pin (22, 110) comprises at least one stop (70, 72, 128, 136) for the airbag module (30), said stop being integrally bonded to the locking pin (22, 110), wherein the locking pin (110) includes at least one at least approximately U-shaped fixture (120) for an electric connection line, the fixture (120) being integrally formed with the locking pin (110).

10. A locking pin (22, 110) for mounting an airbag module (30) in a vertically movable manner on a frame (12) of a motor vehicle steering wheel (10) and at least in part within a foam structure (20) molded onto the frame (12), wherein the locking pin (22, 110) comprises at least one stop (70, 72, 128, 136) for the airbag module (30), said stop being integrally bonded to the locking pin (22, 110), wherein the locking pin (22, 110) comprises a cut (48) extending transversely to its longitudinal center axis (94, 138) and having an approximately plane and rectangular base area (96) for receiving a spring (50) associated with the airbag module (30) in a resiliently locking manner, wherein on at least one web (122, 130) of the at least one stop (128, 136) a substantially mushroom-shaped pin (144) is formed, wherein the latter faces away from the first axial end portion (114) of the locking pin (110).

11. A motor vehicle steering wheel (10) comprising a frame (12) and at least one locking pin (22, 110) for mounting an airbag module (30) in a vertically movable manner on the frame (12) and at least in part within a foam structure (20) molded onto the frame (12), wherein the locking pin (22, 110) includes at least one stop (70, 72, 128, 136) for the airbag module (30) which is formed integrally with the locking pin (22, 110), each stop (70, 72, 128, 136) including a web (74, 76, 122, 130) radially facing away from the locking pin (22, 110) which is transformed into an at least approximately U-shaped bracket (78, 80, 124, 132).

\* \* \* \* \*